Patented Nov. 10, 1925.

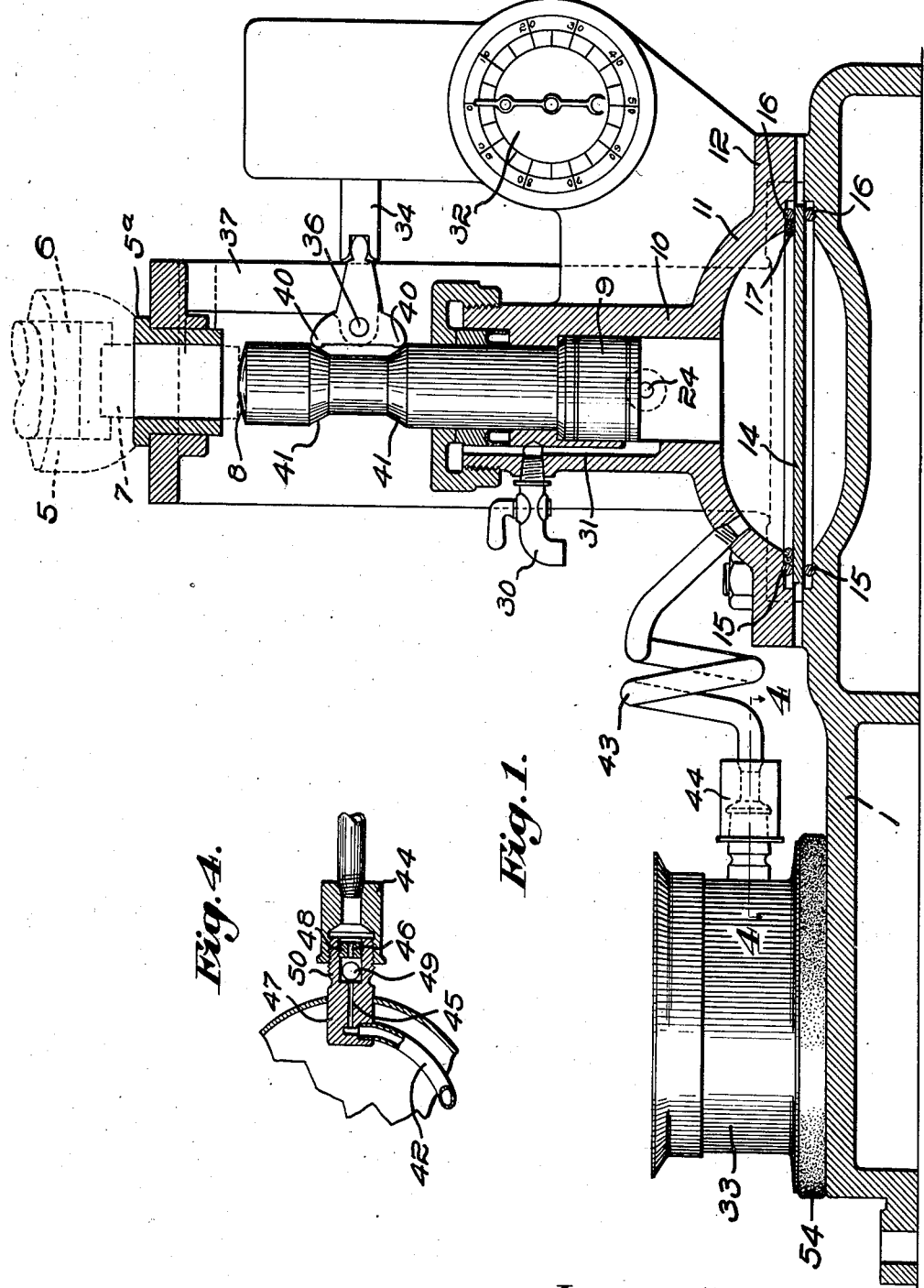

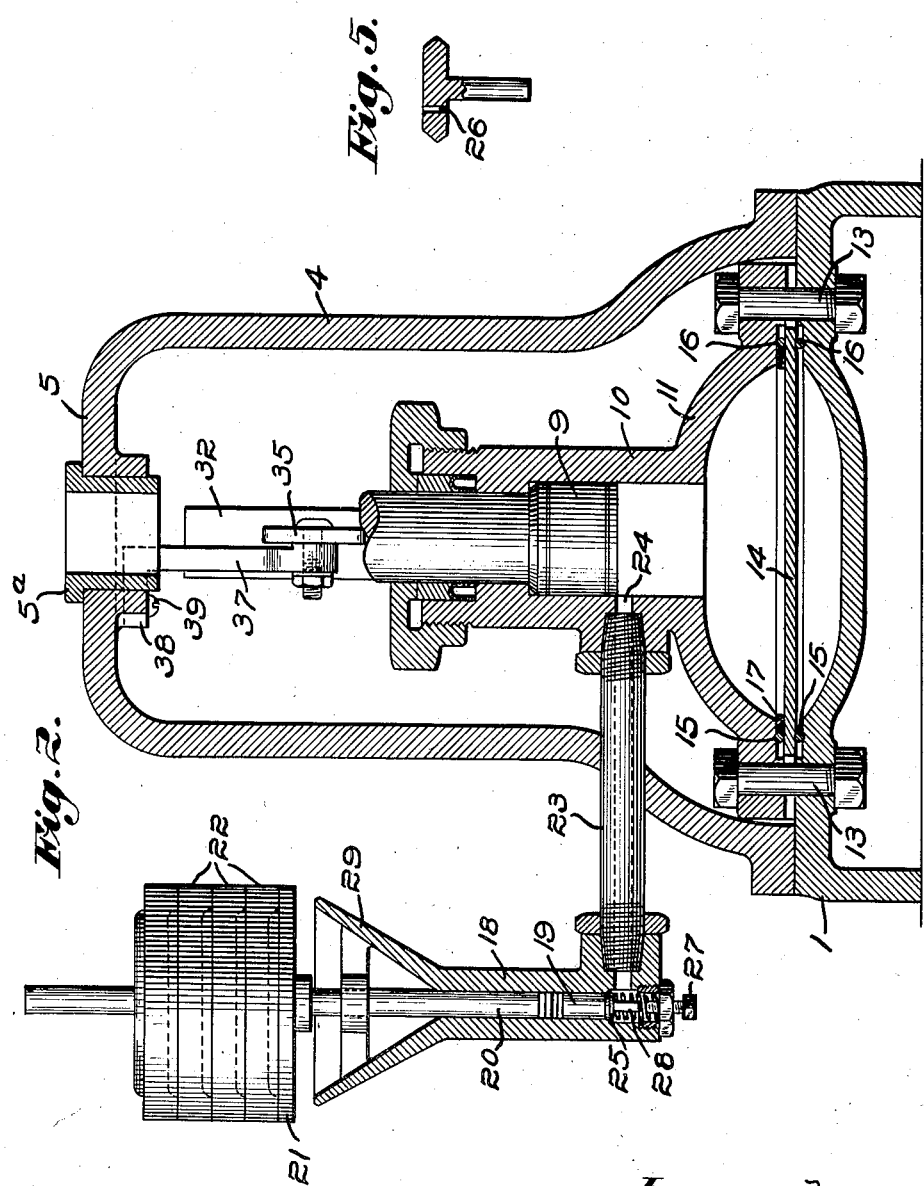

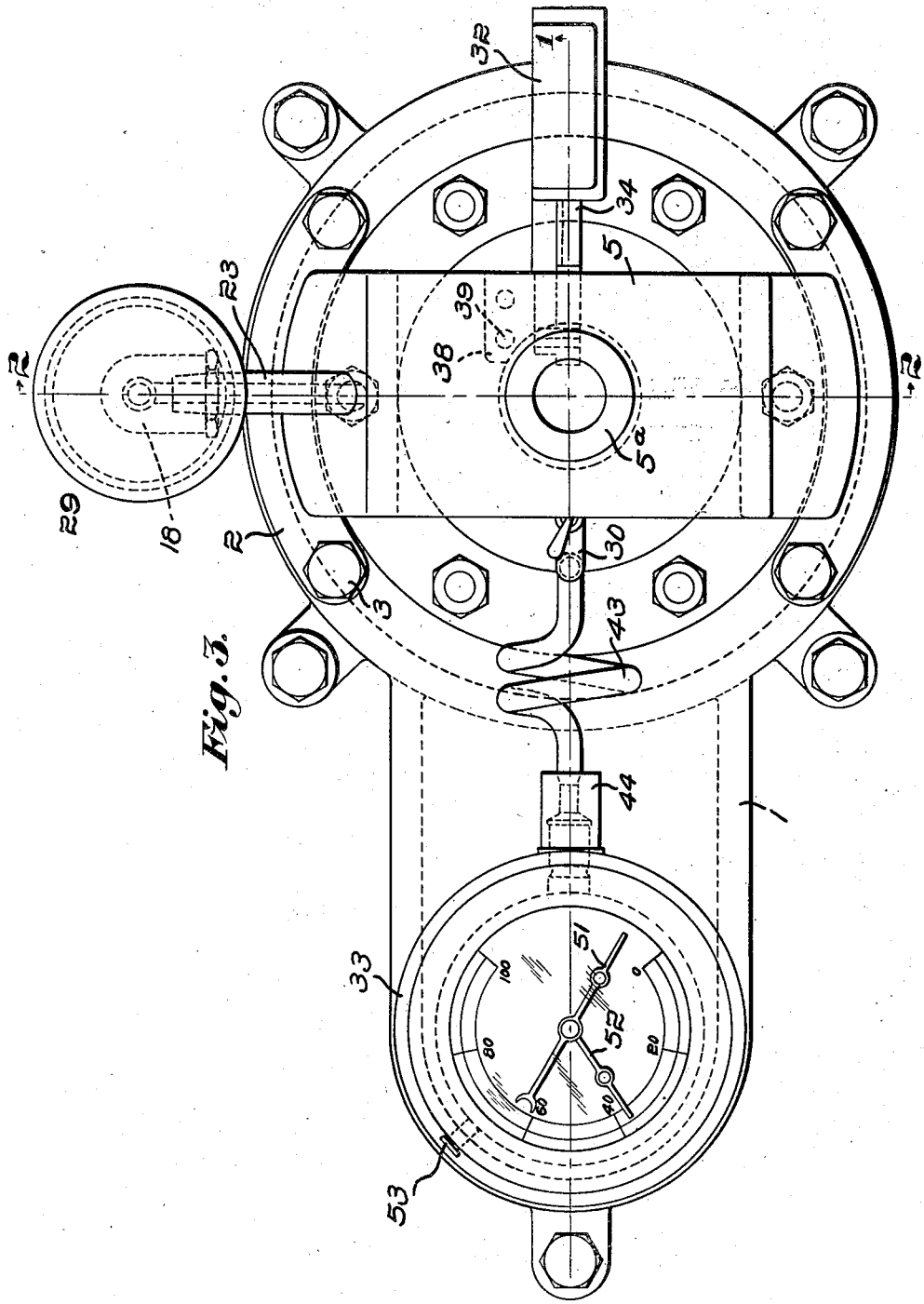

1,561,154

UNITED STATES PATENT OFFICE.

GEORGE H. GILMAN, OF BOSTON, MASSACHUSETTS.

IMPACT-TESTING APPARATUS.

Application filed August 31, 1920. Serial No. 407,185.

*To all whom it may concern:*

Be it known that I, GEORGE H. GILMAN, a citizen of the United States, and a resident of Boston, county of Suffolk, State of Massachusetts, have invented an Improvement in Impact-Testing Apparatus, of which the following description, in connection with the accompanying drawings, is a specification, like characters on the drawings representing like parts.

My invention relates to impact testing apparatus and more particularly but not exclusively to one for testing the characteristics of the impact produced by percussive tools such as pneumatic riveters and rock drills.

My invention will be best understood from the following description, when read in the light of the accompanying drawings of one specific embodiment of my invention submitted for illustrative purposes while its scope will be more particularly pointed out in the appended claims.

In the drawings:

Figure 1 shows a section on the line 1—1 of Fig. 3;

Fig. 2 shows a section on the line 2—2 of Fig. 3;

Fig. 3 is a plan of the submitted embodiment of my invention;

Fig. 4 shows a section on the line 4—4 of Fig. 1; and

Fig. 5 shows on an enlarged scale a detail of the check valve appearing in Fig. 2.

It is of importance to manufacturers and users of impact machines to determine accurately the characteristics of the impact produced. Hereinbefore this has been done by testing the machine under actual working conditions. When it is remembered that manufacturers of rock drills for example, must produce machines for drilling rocks varying from the hardness of jasper to the softness of coal and from the toughness of copper ore to materials with opposite characteristics, such as clay, it will be readily appreciated that it is difficult to obtain for purposes of testing the actual conditions under which such a machine must operate. My invention among other things aims to reproduce these conditions by artificial means.

The illustrative embodiment of the invention will now be described by reference to the drawings. On a suitable base 1 is mounted a support for the tool to be tested. This support comprises the feet 2 secured to the base by suitable bolts 3, the upright portions 4 and an upper portion 5 which is perforated to receive a suitable bushing $5^a$. A tool in position to be tested is shown in dotted lines in Fig. 1, the tool commonly comprising a barrel 5, a hammer 6 and a striking pin 7, the latter extending through the bushing on which the barrel rests.

In operative relation to the support for the tool to be tested is mounted suitable mechanism for measuring or registering the characteristics of the impact produced by the tool. In the submitted embodiment of my invention such mechanism comprises a plunger having an upper surface 8 upon which the striking pin 7 hereinbefore referred to is adapted to rest, the plunger as illustrated further being provided with a head 9 mounted for reciprocatory movement in the cylinder member 10. The lower portion of the cylinder member is flared at 11 and carries a flange 12 secured to the base 1 by means of bolts 13. Between the facing portions of the cylinder member and the base is clamped a diaphragm 14 which may be formed of saw steel or other suitable resilient material.

For securing the diaphragm in position I have herein shown rings 15 which are circular in cross-section and are formed of steel or other suitable material, the base and cylinder member being grooved as shown at 16 to receive the rings.

It will be observed that I have provided by means of the cylinder member, plunger and diaphragm just described, a chamber having two movable walls. This chamber is adapted to be filled with a suitable fluid, preferably a liquid such as oil. For preventing the leakage of such liquid, I herein position a gasket 17 between the upper face of the diaphragm and the adjacent portion of the cylinder member. This gasket conveniently may be in the form of a ring adapted to be clamped between the parts as will be readily understood by those skilled in the art, Preferably I provide means for maintaining the liquid in the chamber herein provided by the cylinder member under pressure and means for varying the pressure; also means for replenishing leakage of liquid from the chamber and for compensating for the expansion of said liquid due to heating of the same caused by the absorption thereby of the energy of the impact. Although I may provide separate accumulators or other means for these purposes, as herein illustrated I have shown a combined volumetric and pressure accummulator which performs all these functions. This accumulator comprises a cylinder 18 providing a chamber 19 in which is reciprocably mounted a plunger 20 carrying a platform 21. On this platform may be placed suitable weights 22, the weights causing the fluid in the chamber 19 to be maintained under pressure. As will be readily understood, the pressure may be varied by varying the number of weights 22 and by means of this pressure I am able to approximate the actual conditions under which the machine to be tested must operate in practice.

As illustrated, connecting the accumulator with the cylinder member is a pipe 23, the pipe communicating with the cylinder through a suitable port 24, formed in the cylinder wall. The port 24 preferably is so positioned that when the plunger is struck, the port 24 is closed thereby shortly after the initiation of movement of the plunger. This prevents the rise in pressure of the fluid beneath the plunger from being communicated to the accumulator.

For further preventing the effect of the impact on the fluid in the cylinder 10 from being transmitted to the accumulator I have illustrated the outwardly opening spring-pressed check valve. This check valve permits a free flow to the cylinder from the accumulator.

In order to compensate for the expansion of the liquid in the chamber herein provided by the cylinder member 10 and relieve the pressure created thereby I preferably provide a restricted by-pass for the check valve 25. In the submitted embodiment of my invention this by-pass takes the form of a hole 26 of small diameter formed through the valve. It will be appreciated that the impact effect on the liquid causing the pressure to rise, owing to the short duration of the blow, will have no appreciable effect in relieving the pressure by means of the restricted passage formed by the hole 26, but that such passage will act to relieve the initial pressure of the fluid in the liquid chamber if such pressure should rise above that originally created by the accumulator. When conditions permit, this passage alone may be relied upon for the transmission of pressure and volume from the accumulator to the cylinder 10 and for the relief of pressure due to the expansion of liquid in the cylinder 10, and for this purpose I provide suitable means for rendering the check valve inoperative, herein illustrated as a screw-threaded stop 27 which may be caused to engage the end of the stem 28 of the check valve and hold the same in permanently closed position.

The upper portion of the accumulator cylinder is illustrated as flared to form a funnel 29 which may be used as a filling orifice when it is necessary to fill the parts of the machine with liquid. For removing the air from the apparatus when the same is being filled I provide a suitable cock 30 communicating by means of a passage 31 with the upper portion of the cylinder 10.

For registering the characteristics of the impact produced by the machine being tested I have herein provided a suitable counter 32 for recording the total number of blows and a gage 33 responsive to the pressure of the fluid in the cylinder member for indicating the force and frequency of the blow.

The counter may be operated by any suitable means responsive to a condition created by the impact and as submitted is responsive to the motion of the plunger and for this purpose I have shown a positive means directly responsive to such movement. To this end I form the counter with an operating arm 34, adapted to be actuated by a rocker 35 pivotally mounted at 36 on a support 37. The support is provided with a foot 38 secured to the upper portion 5 of the tool supporting member by means of suitable screws 39, while the rocker is provided with oppositely projecting fingers 40 engaging the cam surfaces 41 formed on the plunger. The cam surfaces 41 are so formed that the rocker is maintained in constant engagement with the plunger.

The gage 33 may be of any suitable type and as shown by Fig. 4 is provided with a Bourdon tube 42 for actuating the hands of the gage. For connecting the gage with the cylinder member 10 I provide a suitable conduit herein comprising the pipe 43, said pipe being connected with the gage by means of a suitable nipple 44. For preventing the full effect of impact on the liquid from being imparted to the mechanism of the gage, the conduit establishing communication between the Bourdon tube and the cylinder 10 is restricted. For this purpose, in the submitted embodiment of my invention, the Bourdon tube 42 is brazed to a suitable block 47 provided with a restricted passage 45 which establishes communication between the interior of the tube and an enlarged bore 50 in the block. The bore 50 is closed by means of a bushing 48 provided with a restricted passage 46 and between the bushing and the end of the chamber formed by the bore 50 is loosely mounted a check valve in the form of a ball 49. The parts are so formed that the check valve never is positioned with relation to the passages 45 and 46 so that it completely closes them and thereby the fluid is permitted to gradually flow to and from the tube. If desired, the ball 49 may be omitted and either or both the restricted passages 45 and 46 may be relied upon to perform this function. The specific details of the mechanism of the gage are not part of my invention and therefore need not be described. This mechanism operates a hand 51 for indicating the instantaneous value of the impact and a hand 52 for recording the maximum impact. Preferably, I use a known form of gage which is provided with a push button 53, which when operated will return the maximum hand 52 to its zero position.

When impact is imparted to the plunger a portion of the impact effect on the liquid is imparted to the gage and the hand 51 after several blows reaches a point on the dial of the gage which indicates the force or energy of the blow now being delivered. In this position the hand 51 has a slightly vibratory movement which conveys to the operator of the machine knowledge of the speed at which the tool being tested is delivering blows. If the tool being tested is erratic in its performance, the hand 51 will constantly assume different positions in its relation to the dial and thereby convey information of such performance to the operator. The hand 52 of course, will register the maximum blow delivered during this erratic performance.

For relieving the gage 33 of vibration, the pipe 43 may be of flexible material and is shown coiled to increase its tendency to absorb shock. For further limiting the effect of vibration on the gage there is interposed between the same and the base a suitable layer 54 of shock absorbing material such as rubber or felt.

Although I have submitted one specific embodiment of my invention for illustrative purposes it is to be understood that I am not to be limited thereby to its specific mechanical details or arrangement of parts, but that extensive deviations may be made therefrom without departing from the spirit of my invention.

Claims:

1. In a device for testing impact tools, a movable impact receiving member, means resisting such movement comprising a body of liquid under initial pressure contained in a substantially closed chamber with a resilient wall of relatively large area, a counter, an impact register, means responsive to movement of said member for operating said counter, and fluid operated means responsive to the degree of the force of the impact for operating said register.

2. In a device for testing impact tools, a movable impact receiving member, means resisting such movement comprising a body of liquid under initial pressure contained in a substantially closed chamber with a resilient wall of relatively large area, a counter, an impact register, means directly responsive to movement of said member for operating said counter, and fluid operated means responsive to the degree of the force of the impact for operating said register.

3. In a device for testing impact tools, a base, fixed support carried by said base for holding the body of such tools in operative relation to said device, means carried by said base including a movable impact receiving member positioned in operative relation to said support, a counter, an impact register, means responsive to movement of said member for operating said counter, and means responsive to the degree of the force of the impact for operating said register.

4. In a device for testing impact tools a base, a support carried by said base for holding the body of such tools in operative relation to said device, a striking pin movably carried by said support, a substantially closed chamber containing a body of liquid under initial pressure, a movable impact receiving member positioned in operative relation to said striking pin, said member entering said chamber, a counter, an impact register, mechanical means responsive to movement of said member for operating said counter, and fluid operated means responsive to the degree of the force of the impact for operating said register.

5. In a device for testing impact tools, a base, a support for said tools carried by said base and upon which the front end of the tool is adapted to rest in vertical position, said support carrying a striking pin, an impact receiving member operatively positioned with relation to said striking pin, a substantially closed chamber containing a body of liquid under initial pressure in operative relation to said member, and means responsive to the pressure of said liquid for registering a characteristic of such impact.

6. In a device for testing impact tools, a base, a support for such tools carried by said base and upon which the end of the tools may be placed in vertical position, an impact receiving member operatively positioned with relation to said support, a substantially closed chamber containing a body of liquid under initial pressure in operative relation to said member, and means responsive to the pressure of said liquid created by movement of said impact receiving member for registering a characteristic of such impact.

7. In a device for testing impact tools, impact receiving means, fluid means for resisting said impact, and means for maintaining such fluid at a predetermined initial pressure.

8. In a device for testing impact tools, impact receiving means, a chamber containing a fluid body for resisting such impact, means maintaining said chamber under a predetermined initial pressure, and means for replenishing leakage of said liquid from such chamber.

9. In a device for testing impact tools, impact receiving means, fluid means for resisting said impact, means for maintaining such fluid at a predetermined initial pressure, and means responsive to the rise in pressure of said fluid for registering a characteristic of such impact.

10. In a device for testing impact tools, impact receiving means, a chamber having a movable wall and containing a body of liquid for resisting said impact, and means for maintaining said fluid under a predetermined initial pressure.

11. In a device of the character described, impact receiving means, a chamber having a movable wall and containing a body of liquid for resisting said impact, means for replenishing leakage of said fluid, and means for maintaining said fluid under a predetermined initial pressure.

12. In a device of the character described, impact receiving means, a chamber having a movable wall and containing a body of liquid for resisting said impact, means for maintaining said fluid under a predetermined initial pressure, and means responsive to the rise in pressure of said fluid for registering a characteristic of said impact.

13. In an impact testing machine, a chamber, a fluid body in said chamber, means for imparting the force of such impact to said chamber, and automatic means for placing said fluid under initial pressure including a pressure accumulator having means for creating and maintaining a fixed regulatable pressure therein in fluid communication with said chamber.

14. In an impact testing machine, a substantially closed chamber, a fluid body in said chamber, means for imparting the force of such impact to said chamber, means for placing said fluid under substantial initial pressure including a pressure accumulator comprising a second chamber and means for creating and maintaining a fixed pressure therein, and a conduit comprising flow restricting means connecting said chambers.

15. In an impact testing machine, a chamber, a fluid body in said chamber, means for imparting the force of such impact to said fluid, means comprising a conduit in communication with said chamber for maintaining said liquid under a predetermined initial pressure, and means for closing said conduit upon the occurrence of such impact.

16. In an impact testing machine, a chamber, a fluid body in said chamber, means for imparting the force of such impact to said fluid, means comprising a conduit in communication with said chamber for replenishing leakage of fluid from said chamber, and means for closing said conduit upon the occurrence of such impact.

17. In an impact testing machine, a chamber, a fluid body in said chamber, means for imparting the force of such impact to said chamber, and a pressure accumulator having means for creating and maintaining a fixed pressure therein comprising a funnel in fluid communication with said chamber.

18. In an impact testing machine, a chamber, a fluid body in said chamber, means for imparting the force of such impact to said chamber, an accumulator comprising a funnel in fluid communication with said chamber, and a vapor discharge for the upper portion of said chamber.

19. In an impact testing machine, an impact receiving means, a substantially closed chamber including a surface of said impact receiving means, a body of liquid under initial pressure in said chamber, a wall of relatively large area closing said chamber and yielding to the rise of pressure of said liquid on the occurrence of impact, and a fluid pressure gauge connected to said chamber for measuring the force of said impact.

20. In an impact testing machine, an impact receiving means, a substantially closed chamber including a surface of said impact receiving means, a body of liquid under initial pressure in said chamber, a wall of relatively large area closing said chamber and yielding to the rise of pressure of said liquid on the occurrence of such impact, and means independent of said wall responsive to such rise of pressure for registering a characteristic of such impact.

21. In an impact testing machine, a cylinder, a plunger therefor adapted to receive such impact, a yieldable diaphragm closing said cylinder, a fluid body in said cylinder, means for supporting the instrument to be measured in operative relation to said plunger, a counting means operatively connected to said plunger, means for maintaining said fluid under a predetermined initial pressure and means for registering the force of the blow imparted to said plunger.

22. In an impact testing machine, a cylinder, a body of liquid in said cylinder, an accumulator, conduit means connecting said cylinder and accumulator, and a plunger for said cylinder adapted to close said conduit means on the occurrence of impact.

23. In an impact testing machine, a chamber, a liquid body in said chamber, means for imparting the impact to be measured to said body, a pressure responsive registering device, conduit means connecting said chamber and said device, and flow restricting means associated with said conduit for preventing the full effect of said impact from being imparted to said device.

24. In an impact testing machine, a chamber, a fluid body in said chamber, means for imparting the impact to be measured to said body, means yieldingly to increase the volume of said chamber on occurrence of impact, and a pressure responsive device in fluid communication with said chamber.

25. In an impact testing machine, a chamber, a fluid body in said chamber, means for imparting the impact to be measured to said body, means yieldingly to increase the volume of said chamber on occurrence of impact, a pressure responsive device, and a conduit comprising a flow restricting means connecting said chamber and pressure responsive device.

26. In an impact testing machine, means providing a chamber, a fluid body therein adapted to resist such impact, and automatically acting means for eliminating the pressure effect of expansion due to a rise in temperature of said body, said means comprising a second chamber in communication with said first mentioned chamber by way of a restricted passage.

27. In an impact testing machine, means providing a chamber, a fluid body therein adapted to resist such impact, automatically acting means for eliminating the pressure effect of expansion due to a rise in temperature of said body, and automatically acting means for replenishing leakage of such fluid.

28. In an impact testing machine, means providing a chamber, a fluid body therein adapted to resist such impact, means for maintaining said fluid body under a predetermined initial pressure, and means for compensating for the rise in pressure due to expansion of said body.

29. In an impact testing machine, means providing a chamber, a fluid body therein adapted to resist such impact, an accumulator, means establishing communication between said accumulator and said chamber, means preventing the impact effect from being imparted to said accumulator, and means permitting said accumulator to absorb the increase of volume of said fluid body due to expansion thereof.

30. In an impact testing machine, means for receiving such impact comprising a fluid body, a pressure responsive device, a base on which said means and said device are mounted and means connecting said fluid body and pressure responsive device comprising a conduit in the form of a coil to make it flexible.

31. In an impact testing machine, means for receiving such impact comprising a fluid body, a receptacle for said fluid body, a gauge responsive to fluid pressure, a support for said gauge, and means comprising a shock absorbing conduit connecting said fluid body and said gauge.

32. In an impact testing machine, means for receiving such impact comprising a fluid body, a pressure responsive device, means connecting said fluid body and pressure responsive device and a shock absorbing support for said pressure responsive device.

33. In an impact testing machine, the combination with a suitable base, a cylinder member, a diaphragm between said base and member, and means securing said cylinder member to said base.

34. In an impact testing machine, the combination with a suitable base, a cylinder member, a diaphragm between said base and member, means securing said cylinder member and base, a plunger projecting from said cylinder member, and a member for supporting the instrument to be tested in operative relation to said plunger.

35. In an impact testing machine, the combination with a suitable base, a cylinder member, a diaphragm between said base and member, means securing said cylinder member and base, a plunger projecting from said cylinder member, and a member for supporting the instrument to be tested in operative relation to said plunger and carried by said base.

36. In a machine for testing impact tools, a vertically arranged plunger for receiving the impact effect of such tools, means for supporting such tools in operative relation to said plunger and preventing the weight of the tools from being communicated to said plunger, a base on which said support is carried, and a cylinder for said plunger mounted on said base.

37. In an impact testing machine, the base 1, the plunger having the upper end surface 8, the cylinder 10 for said plunger and mounted on said base, and the support having the portion 5 and also mounted on said base.

38. In an impact testing machine, the base 1, the plunger having the end surface 8, the cylinder member 10 for said plunger, the diaphragm 14 clamped between said base and cylinder member, and the support having the portion 5 and upright portion 4 also mounted on said base.

39. In an impact testing machine, a member reciprocated in response to such impact, a device for measuring a characteristic of such impact, actuating means for said device comprising a rocker, a pair of circular cams on said plunger, and cam followers on said rocker in engagement with said cams.

40. In an impact testing machine, a member reciprocated in response to such impact, a device for measuring a characteristic of such impact, actuating means for said device comprising a rocker, and cam surfaces carried by said member maintaining said rocker in constant engagement therewith.

41. In an impact testing machine, a base, a member carried by said base and providing a fluid chamber, impact receiving means in operative relation to said fluid, a second member carried by said base in fixed relation to said first member and providing a support for the instrument to be tested, a device for measuring a characteristic of such impact, actuating means for said device, and supporting means for the latter carried by one of said members.

42. In an impact testing machine, a liquid chamber, means providing two movable walls of relatively large area for said chamber, whereby when impact is imparted to one wall movement of the other will materially modify the effect imparted to the liquid, means for imparting the impact to be tested to one of said means, and a pressure responsive device adapted to be actuated upon movement of one of said walls.

43. In an impact testing machine, a fluid chamber, means including a plunger and providing two movable walls for said chamber, means for imparting the impact to be tested to one of said means, and a pressure responsive device adapted to be actuated upon movement of one of said walls.

44. In an impact testing machine, a fluid chamber, means including a diaphragm and providing two movable walls for said chamber, means for imparting the impact to be tested to one of said means, and a pressure responsive device adapted to be actuated upon movement of one of said walls.

45. In an impact testing machine, a fluid chamber, means including a plunger and a diaphragm providing movable walls for said chamber one of which is adapted to receive the impact to be tested, and a pressure responsive device adapted to be actuated upon movement of one of said walls.

46. In an impact testing machine, a fluid chamber for receiving such impact, reservoir means for maintaining said chamber under constant initial pressure, and a passage of restricted cross section establishing communication between said chamber and said means.

47. In an impact testing machine, a fluid chamber for receiving such impact, reservoir means for replenishing leakage from said chamber, and a passage of restricted cross section establishing communication between said chamber and said means.

48. In an impact testing machine, a fluid chamber for receiving such impact, a pressure fluid accumulator having means for creating and maintaining a fixed pressure therein, a passage establishing communication between said accumulator and chamber, and an outwardly opening check valve in said passage.

49. In an impact testing machine, a fluid chamber for receiving such impact, a pressure fluid accumulator, a passage establishing communication between said accumulator and chamber, an outwardly opening check valve in said passage and a restricted by-pass around said check valve.

50. In an impact testing machine, a fluid chamber for receiving such impact, an accumulator, a passage establishing communication between said accumulator and chamber, and pressure responsive means for automatically varying the flow capacity of said passage.

51. In an impact testing machine, a liquid chamber for receiving such impact, a pressure responsive device, a passage establishing communication between said chamber and pressure responsive device, and a check valve in said passage permitting a limited flow toward said pressure responsive device.

52. In an impact testing machine, a fluid chamber for receiving such impact, a pressure responsive device, a passage establishing communication between said chamber and pressure responsive device, and a double acting check valve in said passage permitting a limited flow toward and away from said pressure responsive device.

53. In an impact testing machine, a fluid chamber for receiving such impact, a pressure responsive device, a passage establishing communication between said chamber and pressure responsive device, and means for automatically varying the flow capacity of said passage.

54. In an impact testing machine, a fluid chamber for receiving such impact, a pressure responsive device, a passage establishing communication between said pressure responsive device and chamber, and means for automatically varying the capacity of said passage for flow in both directions.

55. In an impact testing machine, a fluid chamber for receiving such impact, means for placing said fluid under a predetermined material initial pressure including a pressure fluid accumulator having means for creating and maintaining a fixed regulatable pressure therein, a passage connecting said chamber and accumulator, and means for restricting the capacity of said passage for flow in one direction.

56. In an impact testing machine, a fluid chamber for receiving such impact, means for placing said fluid under a predetermined material initial pressure including a pressure fluid accumulator having means for creating and maintaining a fixed regulatable pressure therein, a passage connecting said chamber and accumulator, and means for automatically restricting the flow through said passage in one direction and permitting a free flow in the opposite direction.

57. In an impact testing machine, an impact receiving member, a substantially closed chamber having therein a liquid body to which said member imparts said impact, fluid pressure operated means responsive to the pressure of said liquid for registering the maximum impact imparted thereto, means for registering the frequency of such impact, and means for registering the instantaneous value of a series of impacts, said last named means comprising a fluid pressure operated means responsive to the pressure of said liquid and in communication with said liquid body by way of a passage having flow restricting means.

58. In a machine for testing impact tools, means providing a chamber having a wall comprising a diaphragm and an impact receiving plunger, a counter operated by said plunger, and a pressure gauge in communication with said chamber.

59. In a machine for testing impact tools, means providing a chamber having a wall comprising a diaphragm and a plunger for receiving impact, a pressure gauge, and a conduit having flow restricting means for connecting said gauge to said chamber.

60. In an impact testing machine, the cylinder member 10, a plunger in said cylinder member, a base, the diaphragm 14 clamped between the cylinder member and base, the pressure gauge 33, and a conduit connecting said gauge to the interior of said cylinder member.

61. In an impact testing machine, the cylinder member 10, a plunger in said cylinder member, the counter 32 operated by said plunger, the pressure gauge 33, a conduit connecting said gauge to said cylinder, and a flow restricting means in said conduit.

62. In an impact testing machine, means providing a chamber closed by a plunger for receiving impact, a wall for said chamber and arranged to yield relatively to said means when the plunger is impacted, and a pressure gauge connected to said chamber.

63. In an impact testing machine, a chamber, a plunger for said chamber, a diaphragm closing said chamber, a pressure responsive register in communication with said chamber, and means for maintaining an adjustable predetermined pressure in said chamber.

64. In an impact testing machine, a chamber, a plunger for said chamber, a diaphragm closing said chamber, a pressure responsive register in communication with said chamber, and a dead-weight accumulator in communication with said chamber.

65. In an impact testing machine, a chamber, a plunger for said chamber, a diaphragm closing said chamber, a pressure responsive register in communication with said chamber, a second chamber in communication with said first chamber, a plunger in said second chamber, and means for applying a constant regulatable pressure on said last named plunger.

66. In an impact testing machine, the combination with the cylinder member 10, of an impact receiving plunger for said member and the diaphragm 11, the gauge 33 in communication with said cylinder member, the cylinder 18 and plunger 20, a conduit having the valve 25 for establishing communication between said cylinder member 10 and said cylinder 18, and means for applying an adjustable pressure on said plunger 20.

In testimony whereof, I have signed my name to this specification.

GEORGE H. GILMAN.